US006959198B2

(12) United States Patent
Mitsugi

(10) Patent No.: US 6,959,198 B2
(45) Date of Patent: Oct. 25, 2005

(54) NETWORK SYSTEM AND INFORMATION COMMUNICATING DEVICE WITH TIME CORRECTION

(75) Inventor: Tatsuya Mitsugi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 698 days.

(21) Appl. No.: 09/859,459

(22) Filed: May 18, 2001

(65) Prior Publication Data

US 2002/0058518 A1 May 16, 2002

(30) Foreign Application Priority Data

Nov. 15, 2000 (JP) .......................... P2000-348534

(51) Int. Cl.[7] .......................... H04Q 7/20; H04Q 7/32

(52) U.S. Cl. ...................... 455/500; 455/502; 455/403; 455/422.1; 455/550.1; 368/13; 368/46; 368/47

(58) Field of Search .......................... 455/456.1, 456.2, 455/456.3, 456.4, 456.5, 456.6, 500, 502, 455/404.1, 404.2, 414.1, 414.3, 412.1, 412.2, 455/414.4, 550.1, 556.1, 556.2, 427, 430, 455/13.2, 12.1, 422.1, 426.1, 426.2; 368/13, 368/46, 47

(56) References Cited

U.S. PATENT DOCUMENTS

| | | | | |
|---|---|---|---|---|
| 5,416,808 A * | 5/1995 | Witsaman et al. | .......... | 375/356 |
| 5,712,867 A * | 1/1998 | Yokev et al. | .............. | 375/136 |
| 6,542,754 B1 * | 4/2003 | Sayers et al. | .............. | 455/502 |
| 2001/0012791 A1 * | 8/2001 | Miyake et al. | ............. | 455/566 |
| 2002/0007453 A1 * | 1/2002 | Nemovicher | ............... | 713/155 |

* cited by examiner

*Primary Examiner*—Keith Ferguson
(74) *Attorney, Agent, or Firm*—Sughrue Mion, PLLC

(57) ABSTRACT

This invention provides a network system and a information communicating device has a time correction ability, wherein a built-in clock of each of the plural devices connected with a communication network is capable of being corrected using a GPS time data without raising a processing load of a receiving device of the GPS data.

In this system a car navigation device 12 receives a data from a GPS satellite, extracts a time data from the received data and transmits the time data attached with a time required within the device itself to a portable telephone in a form of an E-mail. The portable telephone that received the time data from the car navigation device corrects its own time generating means, and transmits the time data with attaching a required time for processing within the portable telephone. In this way, the time data attached with the required time for processing within each corresponding device is transmitted to a following device one by one.

18 Claims, 7 Drawing Sheets

PRIOR ART

NETWORK SYSTEM AND INFORMATION COMMUNICATING DEVICE WITH TIME CORRECTION

TECHNICAL FIELD

The present invention relates to a network system and a information communicating device having a time correction ability, wherein the time correction is carried out by automatically correcting a built-in dock in each of information communicating devices connected through a communication network.

BACKGROUND ART

Due to a recent technological development in a microprocessor and a networking represented by internet system, the information communicating devices such as a personal computer or a portable telephone connected with a communication network are widely used. Although a built-in dock in each device is synchronizing with a dock in its own device, a time error of the dock in each device usually exists. Therefore, an exact time can't be displayed, and an inconsistency of time among the devices arises when an information is exchanged from device to device through the communication network.

Up to now for example, it is a usual method to correct a time lead or lag manually by hearing a telephone service of a time signal by NTT (a name of the Japanese telephone and the telegram company).

However, in this method of making use of the time signal by the telephone, it is troublesome for a user to make a manual correction, and is not always easy to secure a correctness of time. Moreover, recently a communication through a network represented by internet is widely used, and each device is becoming an element of the network system such as configured with a telephone line., rather than a stand-alone device. Under these circumstances, it is very convenient if the clock built in each device can be automatically corrected by utilizing the network system instead of hearing the time signal by the telephone.

To cope with the problem, a time correction system utilizing a GPS satellite is being considered, wherein a GPS means a geographical positioning system. A configuration of the time correction system as a prior art is shown in FIG. 7. In this FIG. 7 an inputting part 1 is for inputting a GPS data transmitted from the GPS satellite, a receiving means 2 is for receiving the GPS data through the inputting part 1 for obtaining a GPS time, and a data converting means 3 is for converting the GPS time obtained in the receiving means 2 to an information which is comparable with an internal clock. A time generating means 4 is for generating a time as the internal clock, and a time displaying means 5 is for displaying the time generated by the time generating means 4. A time data comparing and judging means 6 is for comparing the time generated by the time generating means 4 with the GPS time, and judges whether or not a time error exists in the time generating means 4. A time correcting means 7 is for correcting a time if the time error eats in the time generating means 4, and corrects the internal clock by informing the time generating means 4 of the time to be corrected. The time correcting means 7 is also provided with a forcible correcting function 8 for a user to forcibly correct the internal dock. A transmitting means 9 is for transmitting a time correcting command to an external device such as a personal computer connected to the network system.

In a system configured as mentioned above, it becomes possible to correct the time by utilizing the network system including a device for receiving a GPS signal. However, in the system of this kind including a host machine for receiving the GPS signal, an incessant monitoring of a state of GPS and the internal clock is required. Therefore, a problem also arises wherein a processing load of the host machine becomes high since the time correction command has to be delivered to each device of the network system.

SUMMARY OF THE INVENTION

In view of the above, it is the object of the present invention to provide a network system and a information communicating device have a time correction ability for automatically correcting a built-in clock in each device connected through a communication network.

This invention provides a network system connecting plural information communicating devices for communicating information to each other through a communication network, each of the information communicating devices comprising:

a receiving means for receiving information including a first time information having a time data attached with a reliability data: and a transmitting means for transmitting information including a second time information having said first time information attached with a own reliability data according to own device to the communication network.

A feature of the network system, wherein each of plural information communicating devices further comprises:

a time data generating means for generating a own time data of own device, a time data extracting means for extracting said first time information having said time data with said reliability data from said information received by said receiving means, a time data comparing means for comparing said own time data with said time data with said reliability data in said first time information, and a time correcting means for correcting said lime generating means based on a comparison result by said time data comparing means.

Another feature of the network system, wherein said time data comparing means compares said own time data when said time data with said reliability data in said first time information is within a predetermined range.

Further more feature of the network system, wherein said communication network includes internet.

Further more feature of the network system, wherein said communication network includes a wireless communication network.

Further more feature of the network system, wherein said communication network includes a wired communication network.

Further more feature of the network system, wherein information including said second time information is transmitted by an E-mail from said transmitting means.

Further more feature of the network system, wherein information including said second time information is transmitted using a Web processing from said transmitting means.

Further more feature of the network system, wherein said own reliability data attached to said first time information is based on a processing time required from receiving to transmitting in the information communicating device.

Further more feature of the network system, wherein said reliability data attached to said time data in said first time information is based on the number of said information communicating devices through which said time data passed.

Further more feature of the network system, further comprises a time data extracting device for extracting said time data transmitted from a GPS satellite, wherein said time data extracting device transmits a time information including said time data attached with a reliability data of own device to said information communicating device.

Still further feature of the network system, wherein said information communicating device requests said time data extracting device to transmit information including said time data.

In the network system connecting plural information communicating devices according to the invention, the time data attached with the reliability is received and transmitted through the network device by device, each information communicating device can correct own time data using the received time data attached with the reliability data without control of the host machine.

This invention also provides a information communicating device for communicating information with other information communicating devices through a communication network, the information communicating device comprising;

- a receiving means for receiving information including a first time information having a time data attached with a reliability data: and
- a transmitting means for transmitting information including a second time information having said first time information attached with a own reliability data according to own device to the communication network.

A feature of the information communicating device further comprises:

- a time data generating means for generating a own time data of own device,
- a time data extracting means for extracting said first time information having said time data with said reliability data received by said receiving means,
- a time data comparing means for comparing said own time data generated by said time data generating means with said time data with said reliability data in said first time information, and
- a time correcting means for correcting said time generating means based on a comparison result by said time data comparing means.

The information communicating device according to the invention, can correct own time data using the received time data attached with the reliability data without control of the host machine.

DETAILED DESCRIPTION OF THE PREFERRED EMBODIMENT

In a car navigation system employing GPS as an example, a three-dimensional position of a vehicle is determined based on a difference of each arrival time of a signal from the plural satellites. According to a time correction ability in this invention, only a time component of the signal from satellite is used as a reference of a time data.

Moreover, the GPS time data is not constantly delivered but is distributed to each device through a network system when a device having a GPS receiver transmits information with a GPS time data attached. In this transmission of information, a reliability data for each device is also attached in addition to the GPS time to be usable as a judging criterion on a receiving side.

Figure 1:
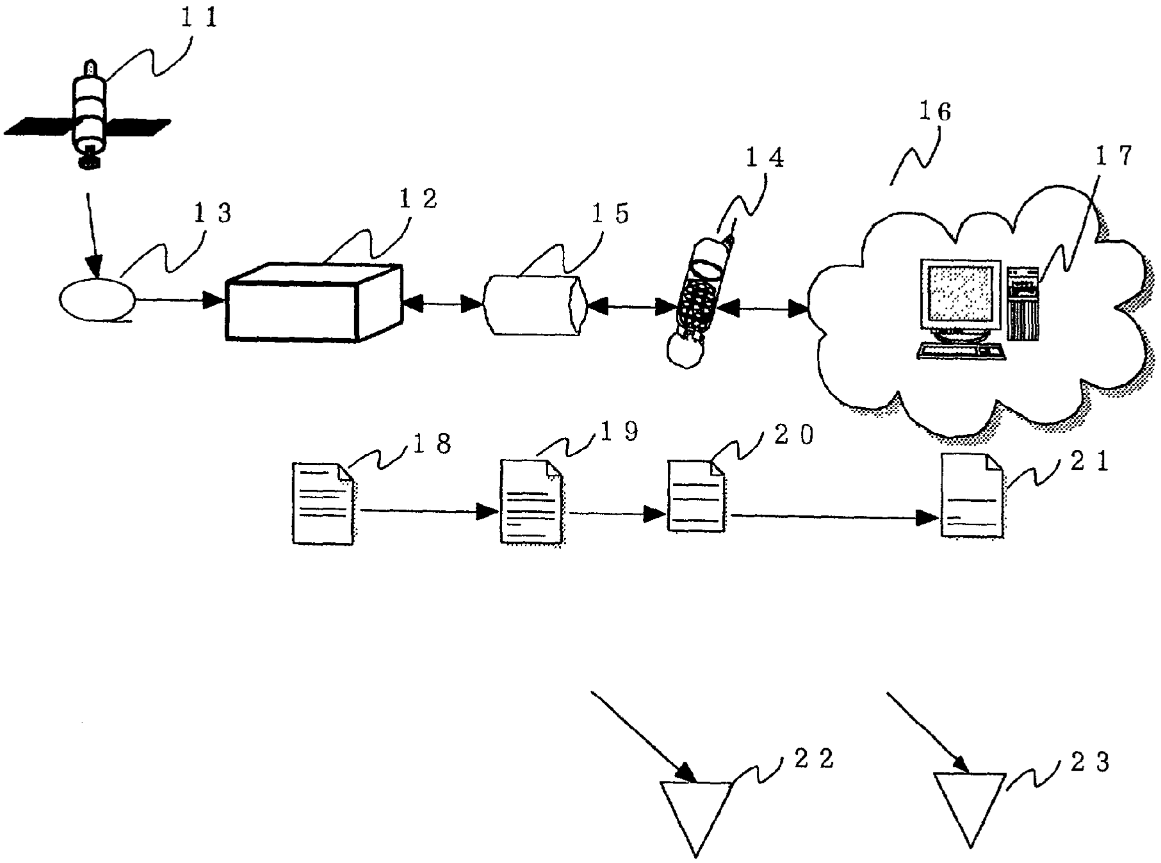
FIG. 1 is an entire network configuration of a network system in an embodiment 1 according to the present invention.

Hereafter, an embodiment 1 is explained referring to the drawings. FIG. 1 is an entire network system configuration having a time correction ability according to the present invention. In FIG. 1 a GPS satellite 11 is for transmitting an information including the GPS time data from the sky to the ground, a car navigation device 12 with a GPS antenna 13 is for receiving information from the GPS satellite 11. The car navigation device 12 acts as a time data extracting device in the network system shown in FIG. 1. The network system has plural information communicating devices including plural portable telephones 14 and plural servers 17 comprising such as personal computers or work stations are connected with a communication network such as internet 16. One portable telephone 14 is connected with the car navigation device 12 through an adapter 15. An E-mail 18 is transmitted from the car navigation device 12, an E-mail 19 is transmitted from the adapter 15 based on the E-mail 18, an E-mail 20 is transmitted from the portable telephone 14 based on the E-mail 19, and an E-mail 21 is transmitted from the servers 17 based on the E-mail 20. By an internal dock correcting process 22, an internal dock of portable telephone 14 is corrected based on the E-mail 19 transmitted from the adapter 15. Furthermore, by an internal dock correcting process 23, an internal dock of server 17 is corrected based on an E-mail transmitted from the portable telephone 14 or other servers 17.

A processing flow of the time correction ability employing a network configuration is described in the following. First of all, a correcting process begins wherein the E-mail 18 is transmitted by the car navigation device 12 which receives the GPS time data. The car navigation device 12 acts as the time data extracting device including a receiving means, a time data extracting means, a processing time computing means and a transmitting means. These receiving means, time data extracting means, processing time computing means and transmitting means of the car navigater 12 are constructed as same as the receiving means 26, time data extracting means 27, processing time computing means 29 and transmitting means 30 respectively, of the information communicating device shown in FIG. 2. In the car navigation device 12, the E-mail 18 is transmitted to the adapter 15. In this case, the E-mail 18 comprises GPS time ( GPS-Time) and a processing time attached, wherein the processing time (hereafter, a processing time 1) is an elapsed time in the car navigation system 12 and is computed by the processing time computing means before the E-mail 18 is transmitted. Namely, the GPS time is extracted from the GPS data in the car navigation device 12 by its time data extracting means, then the processing time 1 is attached to the GPS time , and is transmitted as the E-mail 18 to the network system by a transmitting means in the car navigation device 12.

When the adapter 15 which received the E-mail 18 from the car navigation device 12 transmits the E-mail 18 to the portable telephone 14, the adapter 15 attaches a processing time 2 to the E-mail 18 to form the E-mail 19, wherein the processing time 2 is the time required from receiving to transmitting within the adapter 15. Similarly, when the portable telephone 14 which received the E-mail 19 from the adapter 15 transmits the E-mail 19 to a specific server on internet, the portable telephone 14 attaches a processing time 3 to the E-mail 19 to form the E-mail 20 wherein the processing time 3 is a time required from receiving to transmitting within the portable telephone 14.

At this time, the portable telephone 14 having a time displaying function based on the internal dock separates the GPS time and the reliability data from the E-mail 19 received from the adapter 15. Then the portable telephone 14 judges based on a comparison between the GPS time with the reliability data and a clock data within the portable telephone 14 for correcting the internal clock.

In the same way, the data is transmitted and received repeatedly from one server of the servers 17 to the adjacent server of the servers 17 one by one within internet 16. Namely, any server of the servers 17 which received an E-mail from the precedent server attaches a processing time n, for example, in itself, and transmits the time data as the E-mail 21 to the next server of the servers 17.

At this time, each server of the servers 17 are provided with a clock function based on the internal dock, and separates the GPS time and the reliability data (a processing time 1, 2, . . . , n−1) from the received E-mail. Then, the GPS time and the reliability data are compared with a time data within each server, and judged for correcting the internal dock of each server.

Additionally for example, when the $10^{th}$ server attaches its processing time 10 at transmitting data to the next server, the processing time 10 can be a sum of the processing time 1 to 10 with adding a data to indicate it instead of the time of $10^{th}$ server only.

Furthermore in general, the network system in the embodiment 1 can be configured to include a wireless network and a wired network besides internet.

Figure 2:
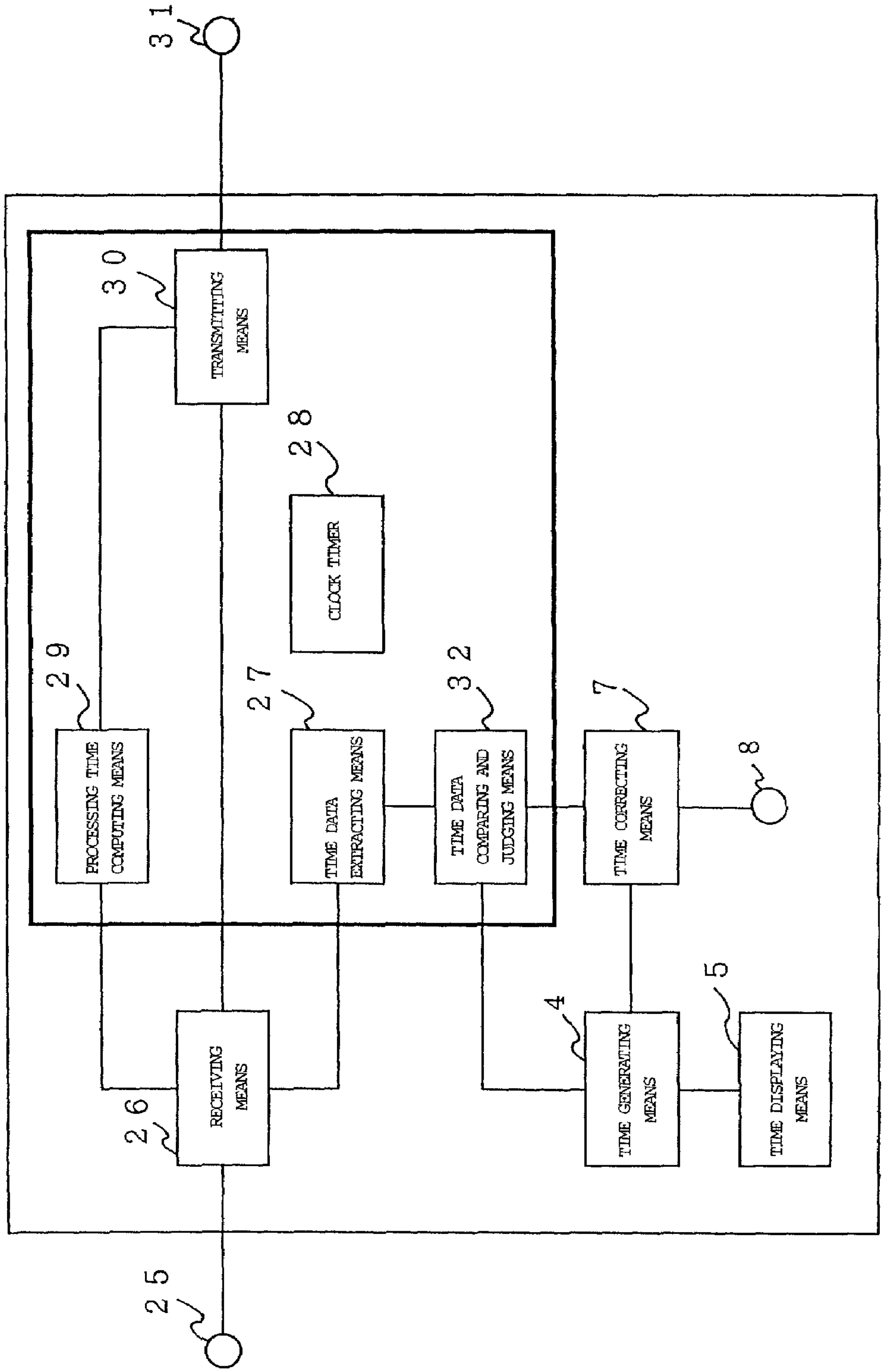
FIG. 2 is a configuration of the information communicating device in the embodiment 1 according to the present invention.
Figure 7:
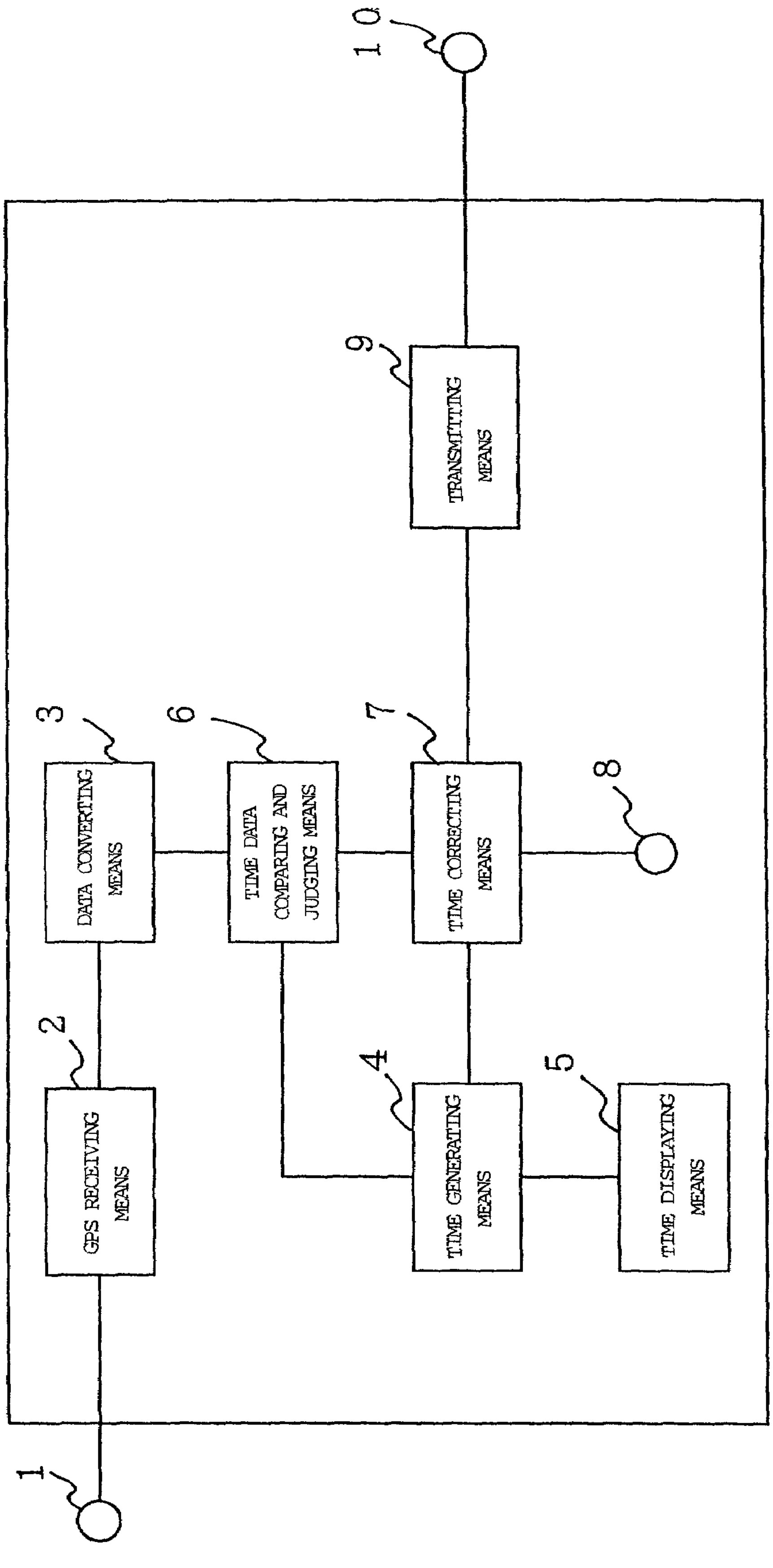
FIG. 7 is a configuration of a time correction system in the prior art.

FIG. 2 is a configuration of the time correction function of the information communicating device in the embodiment 1 according to the present invention, and a time correcting method based on an E-mail attached with time information in each device is shown. The information communicating device reference to FIG. 2 is each portable telephone 14 or each server 17. In FIG. 2 a numeral 4, 5, 7 and 6 indicate the same means with those in FIG. 7 corresponding to the prior art, and the explanation is abbreviated. A communication inputting part 25 is for inputting communication information, a receiving means 26 is for receiving communication information through the communication inputting part 25, a time data extracting means 27 is for extracting a time data from communication information received by the receiving means 26, and a processing time computing means 29 is for starting a computation of a processing time when the receiving means 26 begins to function based on a dock timer 28. a transmitting means 30 attaches a computed result in the processing time computing means 29 to received information for transmitting to the following device through a communication outputting part 31. A time data comparing and judging means 32 makes a judgment based on a comparison between a time data generated by a time generating means 4 and the time data extracted by the time data extracting means 27.

An explanation is made as to a function in FIG. 2 in the following. Communication information from the communication inputting part is obtained by the receiving means 26, and the time data is extracted by the time data extracting means 27. On the other hand, as soon as the receiving means 26 begins to function, the processing time computing means 29 starts calculating the processing time using the dock timer 28. Received information is attached with a computed result in the processing time computing means 29, and transmitted by the transmitting means 30 to the following device through the communication outputting part 31.

A time generated by the time generating means 4 is used in the time displaying means 5 and is displayed. And the time data comparing and judging means 32 compares the time data generated by the time generating means 4 with the time data extracted by the time data extracting means 27, and judges a time error of the internal dock. And if the time error is judged to exist in the internal dock, it is corrected by the time correcting means 7, the result is notified to the time generating means 4, and the internal dock is corrected. Here, the time correcting means 7 is provided with a forcible correcting function 8 for a user to forcibly correct the internal clock.

From now on, an explanation of a processing flow is made using a flow chart concerning the processing time computing means, the transmitting means, the time data extracting means and the time data comparing and judging means.

Figure 3:
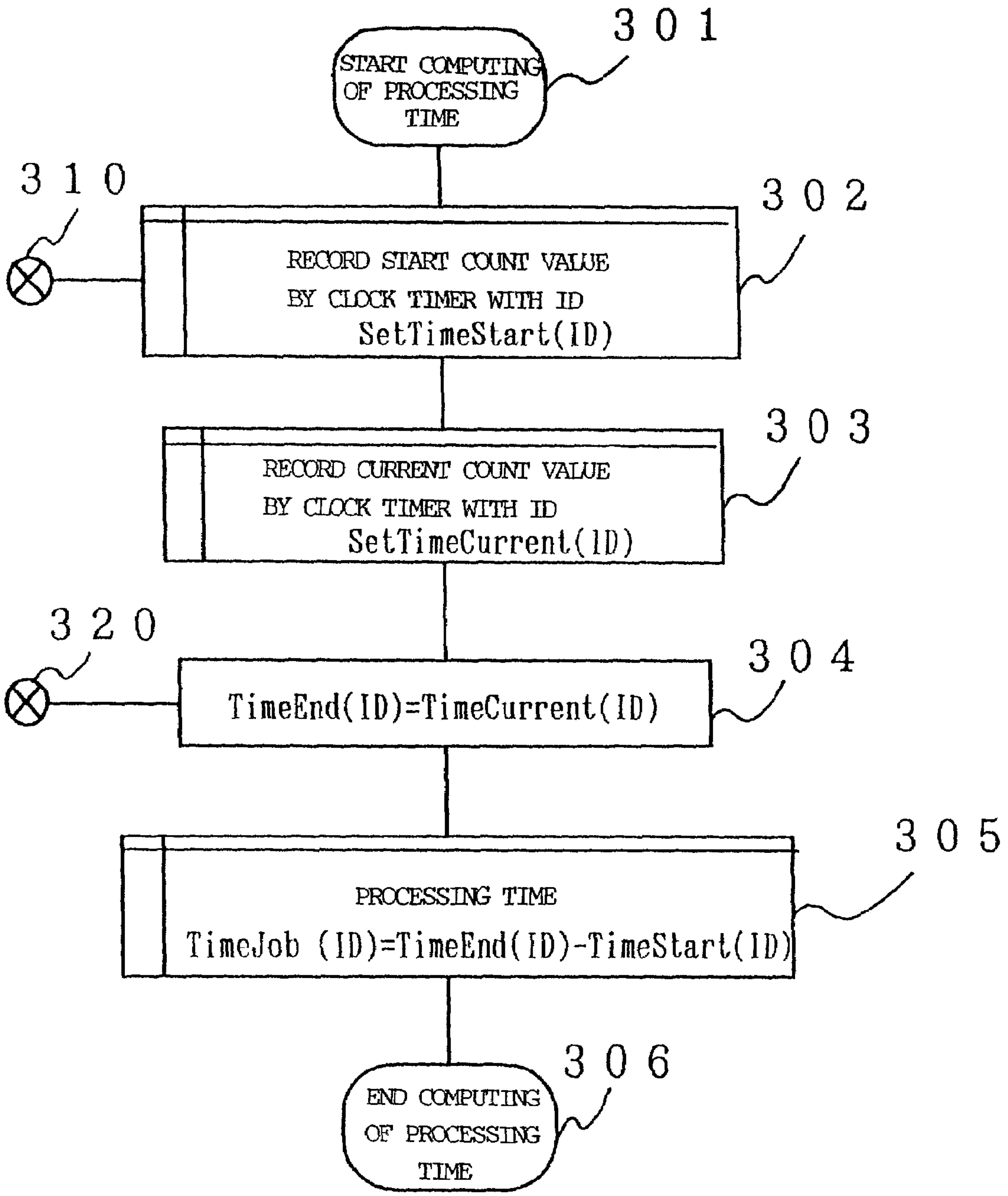
FIG. 3 is a flowchart showing an internal function of a processing time computing means of the information communicating device in the embodiment 1 according to the present invention.

FIG. 3 is a flowchart showing an internal function of the processing time computing means 29 of the information communicating device in the embodiment 1 according to the present invention. In step 301 the processing time computing means 29 is called up when the receiving means 26 starts receiving a signal in step 310. In step 302 the processing time computing means 29 records a value of the clock timer 28 as the first called-up time when it is called up by the receiving means 26 with a unique identification number (so called ID) in communication information. Then in step 303 a present value of the clock timer 28 is kept being recorded with ID at all times. When information is transmitted from the transmitting means 30, the processing time computing means 29 is called up with ID in step 320, and records a value of the clock timer at this moment as the last time in step 304. Then in step 305, the processing time is computed from a obtained result in step 304 and step 302, and a processing ends in step 306.

Figure 4:
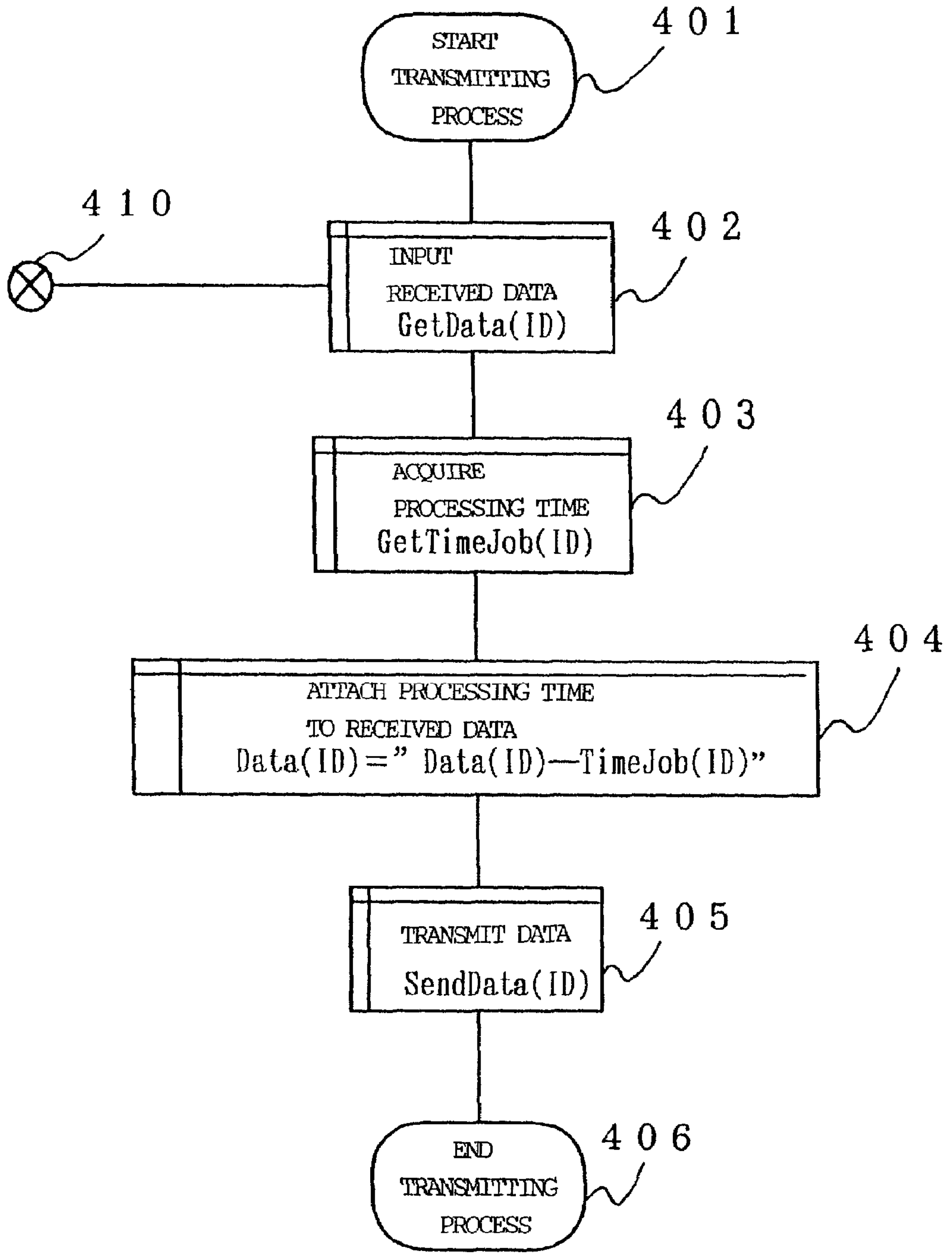
FIG. 4 is a flowchart showing an internal processing function of a transmitting means of the information communicating device in the embodiment 1 according to the present invention.

FIG. 4 is a flowchart showing an internal processing function of a transmitting means 30 in FIG. 2. Every time the transmitting means 30 is called up by the receiving means 26 in step 410, a transmitting process is started in step 401. In step 402, the transmitting means 30 obtains a receiving data with ID from the receiving means 26, and a processing advances to step 403. In step 403, ID is given to the processing time computing means 29, and the processing time corresponding to ID is obtained from the processing time computing means 29. Then in step 404, the processing time corresponding to ID is attached to a predetermined format of the receiving data corresponding to ID, and a processing goes to step 405. In step 405, the receiving data with ID attached is transmitted to the following device, and the whole process of the transmitting process is finished in step 406.

Figure 5:
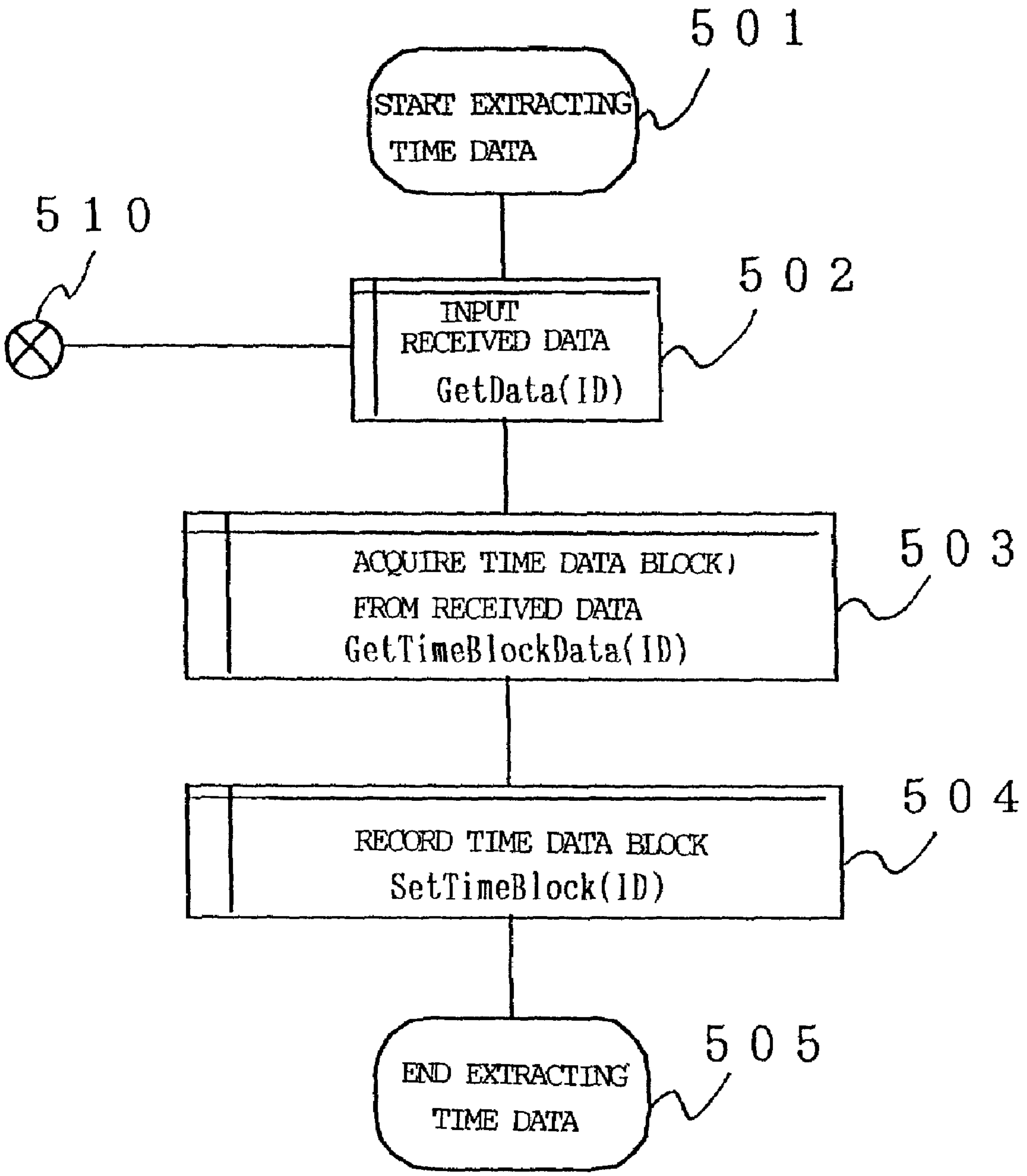
FIG. 5 is a flowchart showing an internal processing function of a time data extracting means of the information communicating device in the embodiment 1 according to the present invention.

FIG. 5 is a flowchart showing an internal processing function of a time data extracting means 27 in FIG. 2. In step 501 a processing is started when the time data extraction means 27 is called up by the receiving means 26 in step 510. In step 502 the receiving data with ID is obtained from the receiving means 26 and a processing advances to the next step. Namely, in step 503 a time data block concerning the time data is extracted from a predetermined format of the receiving data. Then, in step 504 the time data block is memorized and informed to the time data comparing and judging means 32, and a processing ends in step 505.

Figure 6:
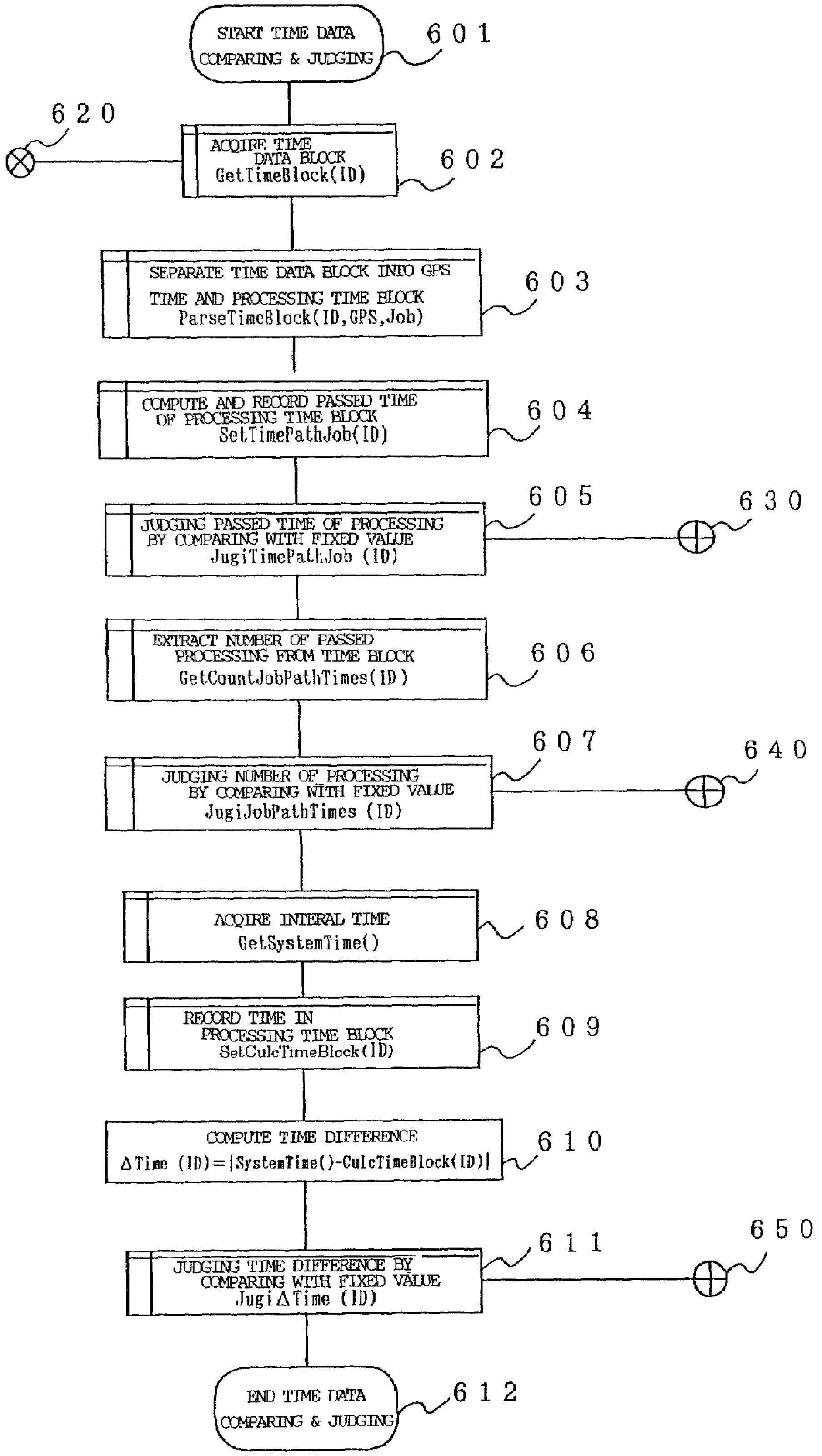
FIG. 6 is a flowchart showing an internal processing function of a time data comparing and judging means of the information communicating device in the embodiment 1 according to the present invention.

FIG. 6 is a flowchart showing an internal processing function of a time data comparing and judging means 32 in FIG. 2. In step 601 a processing is started when the time data comparing and judging means 32 is called up by the time data extracting means 27 in step 620. In step 602 the time data block with ID is obtained and a processing goes to step 603, wherein the time data block is separated into the GPS time and a processing time block. In step 604 a passed time is computed and memorized, wherein the passed time is an elapsed time until the device receives the GPS data transmitted from the precedent device and is computed from the data of the processing time in each precedent device recorded in the processing time block. In step 605, a fixed value of the passed time as the reliability data until the device gets the received data and an actual passed time in this device obtained in step 604 are compared and judged. Namely, if the actual passed time in the device is out of scope of the fixed value as the reliability data, a processing ends in step 630,and otherwise, the processing transfers to step 606. In step 606 the number of a passed processing until the receiving data is received in the device is computed and memorized from a processing time data recorded in the processing time block corresponding to each device. In step 607 a fixed value of the number of the passed processing as the reliability data until the device gets the received data and the actual number of the processing obtained from the receiving data are compared and judged. Namely, if the actual number of the passed processing in the device is out of scope of the fixed value of the number of the passed processing as the reliability data, a processing ends in step 640, and otherwise, the processing transfers to step 608.

In step 608, if both the actual passed time obtained in step 605 and the actual passed number respectively obtained in 606 are within a scope of the fixed values of the passed time and the passed number as the reliability data obtained, the time data block obtained in step 603 is judged to be reliable, and a present time is acquired from the time generating means 4 in the device.

In step 609, the time data taking account of the GPS time and the passed time in the device itself is computed and recorded from the time data block in the received data.

In step 610, a time difference between the time acquired in step 608 and the time obtained in step 609 is computed. In step 611 a fixed value of the time difference required to correct a time in the device and the time difference obtained in step 610 are compared and judged. A processing ends in step 650 if the time difference obtained in step 610 is out of scope of the fixed value of the time difference, and otherwise, a necessity for correcting a time is informed to the time correcting means 7.

Then, the time correcting means 7 instructs the time generating means 4, whereby the time in the time generating means is to be corrected based on the time data obtained in step 609 in the time data comparing and judging means 32.

Furthermore, the number of the passed processing is usable instead of the passed time of the processing as the reliability data. In that case, a constant value of 1 usually can be added to the number of the passed processing in the received data for transmitting, and a usability of the number of the passed processing received can be judged based on whether or not the number is no larger than, for example, 10 as a regulated.

In addition, an increased volume of the accumulated data is avoidable by not transmitting the time data if the reliability data exceeds, for example, the predetermined value of 20.

In the embodiment 1 of the time correction system according to the present invention, it is not necessary for the host machine such as the car navigation system 12 capable of receiving the GPS data including the time through the GPS antenna 13 to make an incessant monitoring of GPS and the internal clock. Moreover, the host machine is not required to command for correcting time to each device on the network system. Namely, a time correction of the internal clock in each device on the network system is automatically executed, and accordingly a processing load of the host machine is alleviated Furthermore, as a dedicated data transmission and reception for the time correction is unnecessary, the time correction becomes possible in a format of the E-mail or a Web processing.

Moreover, as the reliability data is attached to the GPS time data, each device can judge a validity of the time data in correcting the internal clock and an erroneous correction is avoidable.

Furthermore, a wired or a wireless network as well as internet is applicable to the system explained so far. A versatility of configuring the system configuration equivalent to the time correction system, heretofore, explained.

Furthermore, the time correction in each server is possible based on an answer from the host machine for a time inquiry from each server as a transmitted data from the host machine can be configured to include the time data.

What is claimed is:

1. A network system connecting plural information communicating devices for communicating information to each other through a communication network, each of the information communicating devices comprising:

a receiving means for receiving information comprising a first time information having a first time data attached with a first reliability data; and a transmitting means for transmitting information comprising a second time information having said first time information attached with a second reliability data to the communication network, wherein the second reliability data indicates a reliability of the first time information included in the second time information and the second reliability data is calculated in a device transmitting the information.

2. The network system claimed in claim 1, wherein each of plural information communicating devices further comprising:

a time data generating means for generating a second time data of the transmitting device;

a time data extracting means for extracting said first time information from said information received by said receiving means;

a time data comparing means for comparing said second time data with said first time data with said first reliability data; and a time correcting means for correcting said time generating means based on a comparison result by said time data comparing means.

3. The network system claimed in claim 2, wherein said time data comparing means compares said second time data when said first time data with said first reliability data is within a predetermined range.

4. The network system claimed in claim 1, wherein said communication network comprises internet.

5. The network system claimed in claim 1, wherein said communication network comprises a wireless communication network.

6. The network system claimed in claim 1, wherein said communication network comprises a wired communication network.

7. The network system claimed in claim 1, wherein the information comprising said second time information is transmitted by an E-mail from said transmitting means.

8. The network system claimed in claim 1, wherein the information comprising said second time information is transmitted using a Web processing from said transmitting means.

9. The network system claimed in claim 1, wherein said second reliability data attached to said first time information is based on a processing time required from receiving to transmitting in the transmitting information communicating device.

10. The network system claimed in claim 1, wherein said first reliability data attached to said first time data in said first time information is based on the number of said information communicating devices through which said time data passed.

11. The network system claimed in claim 1, further comprising a time data extracting device for extracting time data transmitted from a GPS satellite, wherein said time data extracting device transmits a time information including said time data attached with a reliability data of the extracting device to said information communicating device.

12. The network system claimed in claim 11, wherein said information communicating device requests said time data extracting device to transmit information comprising said time data.

13. The network system claimed in claim 1, wherein said receiving means receive the information from a previous transmitting device from said information communicating devices, and wherein said received first time data attached with said first reliability data is time data received by the previous transmitting device adjusted by required processing time from receiving to transmitting in the previous transmitting device.

14. The network system claimed in claim 13, wherein the second reliability data is processing time required by the transmitting device, the transmitting device is a current transmitting device, and wherein information received by a next transmitting device from said information communicating devices comprises time received from a GPS corrected by processing times of all previous devices that transmitted time information before the information reached the next transmitting device, said all previous devices comprise the previous transmitting device and the current transmitting device.

15. A information communicating device for communicating information with other information communicating devices through a communication network, the information communicating device comprising:

a receiving means for receiving information comprising a first time information having a first time data attached with a first reliability data; and a transmitting means for transmitting information comprising a second time information having said first time information attached with a second reliability data to the communication network, wherein the second reliability data indicates a reliability of the first time information included in the second time information and the second reliability is calculated based on a device transmitting the information, and wherein the second reliability data comprises time required from the reception of the data to the transmission of the data in the device transmitting the information.

16. The information communicating device claimed in claim 15, further comprising:

a time data generating means for generating a second time data of the transmitting device;

a time data extracting means for extracting said first time information having said first time data with said first reliability data received by said receiving means, a time data comparing means for comparing said second time data with said first time data with said first reliability data in said first time information; and a time correcting means for correcting said time generating means based on a comparison result by said time data comparing means.

17. A network system for communicating accurate time information to a plurality of communicating devices comprising:

a first communicating device receiving time information from a remote source and transmitting time data comprising the received time information adjusted by a processing time in the first communicating device; and a second communicating device receiving the transmitted time data and adjusting clock of the second communicating device using the received time data, wherein the processing time comprises a lapsed period of time from a moment when the first communicating device received the time information to a moment when the first communicating device is ready to transmit the received time information.

18. The network system according to claim 17, wherein the processing time further comprises an identification number to match the calculated processing time with the received time information.

* * * * *